Nov. 10, 1925.
T. F. MADIGAN
1,561,337
QUICK RELEASE SAFETY HOOK
Filed Aug. 30, 1924
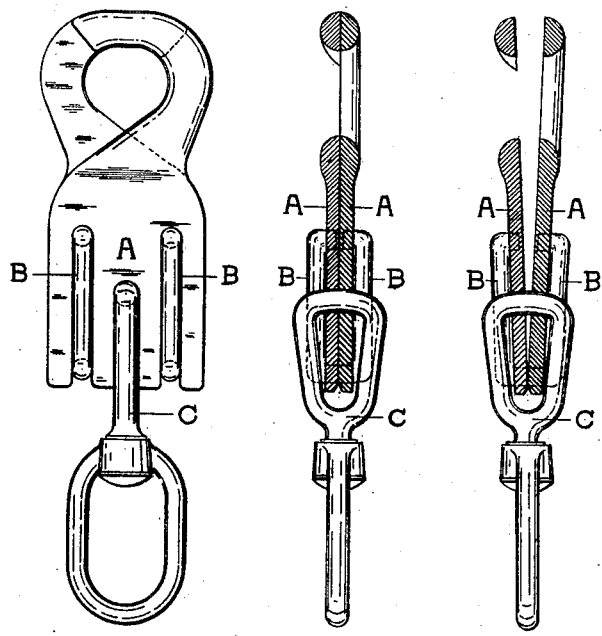
INVENTOR,
Thomas F. Madigan
BY
ATTORNEYS.

Patented Nov. 10, 1925.

1,561,337

UNITED STATES PATENT OFFICE.

THOMAS FRANCIS MADIGAN, OF BENESS, VIA LEETON, NEW SOUTH WALES, AUSTRALIA.

QUICK-RELEASE SAFETY HOOK.

Application filed August 30, 1924. Serial No. 735,103.

*To all whom it may concern:*

Be it known that I, THOMAS FRANCIS MADIGAN, a subject of the King of Great Britain and Ireland, residing at Beness, via Leeton, State of New South Wales, Commonwealth of Australia, have invented a certain new and useful Quick-Release Safety Hook, of which the following is a specification.

This invention relates to a quick release safety hook of novel design which is simple to manufacture, easy to manipulate and durable.

It comprises two complementary hook-shaped body members and two clamping springs in addition to a link, preferably a swivel link, whereby the hook proper is attached to a length of chain or elsewhere.

In order that my invention may be the better understood I will describe the same with reference to the accompanying drawings in which—

Fig. 1 is a face view, and Figs. 2 and 3 are central cross sectional views, the one showing the two body members of the hook closed and the other showing them opened as for attachment to or release from a link or other fixing.

It will be seen from the drawing that each of the two body members A A consists of a flat plate having a hook-shaped finger projecting from one end of same, the two hook-shaped fingers overlapping one another and together forming a closed eye.

Engaging the flat plate members and normally holding them together are two long U-shaped springs B B the bows of which fit into slots or grooves in the edges of the plates and the extremities of which are bent inward and fit into sockets in the faces of the plates.

It will be seen that the springs B B are therefore securely retained in place upon the members A A and that they normally clamp the members A A together, but when it is desired to attach the hook or to detach it the hook-shaped ends of the members A A may be readily spread apart a sufficient distance for the purpose, the springs B B being slightly distorted.

The link C may be of any usual or approved pattern.

What I claim is—

1. A quick release safety hook comprising two complementary hook-shaped body members and two U shaped springs which embrace and flexibly clamp such body members together.

2. A quick release safety hook comprising two complementary hook-shaped body members, two U shaped springs which embrace and flexibly clamp the body members together, and a link whereby the body members are attached to a length of chain or elsewhere.

3. A quick release safety hook comprising two complementary hook-shaped body members each of which consists of a flat plate having a hook-shaped finger projecting from one end of same the two hook-shaped fingers overlapping one another and together forming a closed eye, said plate having slots or grooves in the edges remote from the finger ends and sockets in their outer faces, and two U shaped springs the bows of which fit into said slots or grooves and the extremities of which fit into said sockets in the faces of the plates, in combination with a link whereby the hook proper is attached to a length of chain or elsewhere.

In testimony that I claim the foregoing as my invention I have signed my name this fifteenth day of July 1924.

THOMAS FRANCIS MADIGAN.